(12) United States Patent
Davidson et al.

(10) Patent No.: US 7,968,811 B2
(45) Date of Patent: Jun. 28, 2011

(54) INTEGRATED IGNITION AND KEY SWITCH

(75) Inventors: Willie G. Davidson, Delafield, WI (US);
Jim Williams, Waterford, WI (US);
Christopher R. Poquette, Neenah, WI (US); Michelle Waite, Milwaukee, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 928 days.

(21) Appl. No.: 11/771,885

(22) Filed: Jun. 29, 2007

(65) Prior Publication Data
US 2009/0000924 A1 Jan. 1, 2009

(51) Int. Cl.
*H01H 3/02* (2006.01)
*H01H 3/14* (2006.01)

(52) U.S. Cl. .............. 200/52 R; 200/43.05; 200/43.08
(58) Field of Classification Search ............ 200/52 R
See application file for complete search history.

(56) References Cited

U.S. PATENT DOCUMENTS

| | | | | |
|---|---|---|---|---|
| 4,146,761 A | * | 3/1979 | Sung | 200/43.04 |
| 4,264,792 A | * | 4/1981 | Gillette | 200/43.08 |
| 5,833,049 A | * | 11/1998 | Yamashita et al. | 200/284 |
| 7,290,416 B2 | * | 11/2007 | Ohtaki et al. | 70/252 |

OTHER PUBLICATIONS

Custom Chrome, Inc., Custom Chrome 1994 Catalog, pp. 246-249, Morgan Hill, California.
Harley-Davidson, Inc., Parts Catalog FL Models 1941 to 1984, pp. 54-57, 60-61, Milwaukee, Wisconsin.
Harley-Davidson, Inc., Parts Catalog Tour-Glide, FLT-80, 1980, pp. 90-91, Milwaukee, Wisconsin.

* cited by examiner

*Primary Examiner* — Renee Luebke
*Assistant Examiner* — Lheiren Mae Caroc
(74) *Attorney, Agent, or Firm* — Michael Best & Friedrich LLP (57) ABSTRACT

An ignition and key switch assembly for a motorcycle includes a cover having a front surface, a rear surface, a first cover portion and a second cover portion, an ignition coil located in the first cover portion, the ignition coil being held in the first cover portion by a protective layer, and a key switch received within the second cover portion and being accessible at the cover front surface. A mounting bracket is provided for mounting the cover to the key switch and an aligning feature is provided for aligning the cover to the key switch.

19 Claims, 9 Drawing Sheets

INTEGRATED IGNITION AND KEY SWITCH

FIELD OF THE INVENTION

The present invention relates to an ignition assembly for a motorcycle.

BACKGROUND

Motorcycle owners typically place a premium on the aesthetic appearance of their motorcycles such that manufacturers are constantly trying to enhance the image of their products. One technique used by manufacturers to augment the appearance of a motorcycle is to cover certain parts of the motorcycle with more aesthetically-pleasing covers.

One of the parts commonly covered on the motorcycle is an ignition coil. The ignition coil is often mounted to the motorcycle using conventional mounting hardware that is in plain view once the cover is assembled over the ignition coil.

SUMMARY

In one embodiment, the invention provides an ignition and key switch assembly for a motorcycle. The assembly includes a cover having a front surface, a rear surface, a first cover portion and a second cover portion. An ignition coil is located in the first cover portion, and is held in the first cover portion by a protective layer. A key switch is received within the second cover portion and is accessible at the cover front surface.

In another embodiment the invention provides a method of installing an ignition and key switch on a motorcycle. The method includes securing the key switch to the motorcycle, sliding a cover over the key switch to locate the cover within a first portion of the cover, the cover supporting an ignition coil in a second portion, securing the cover to the key switch, and coupling the key switch and the ignition coil.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
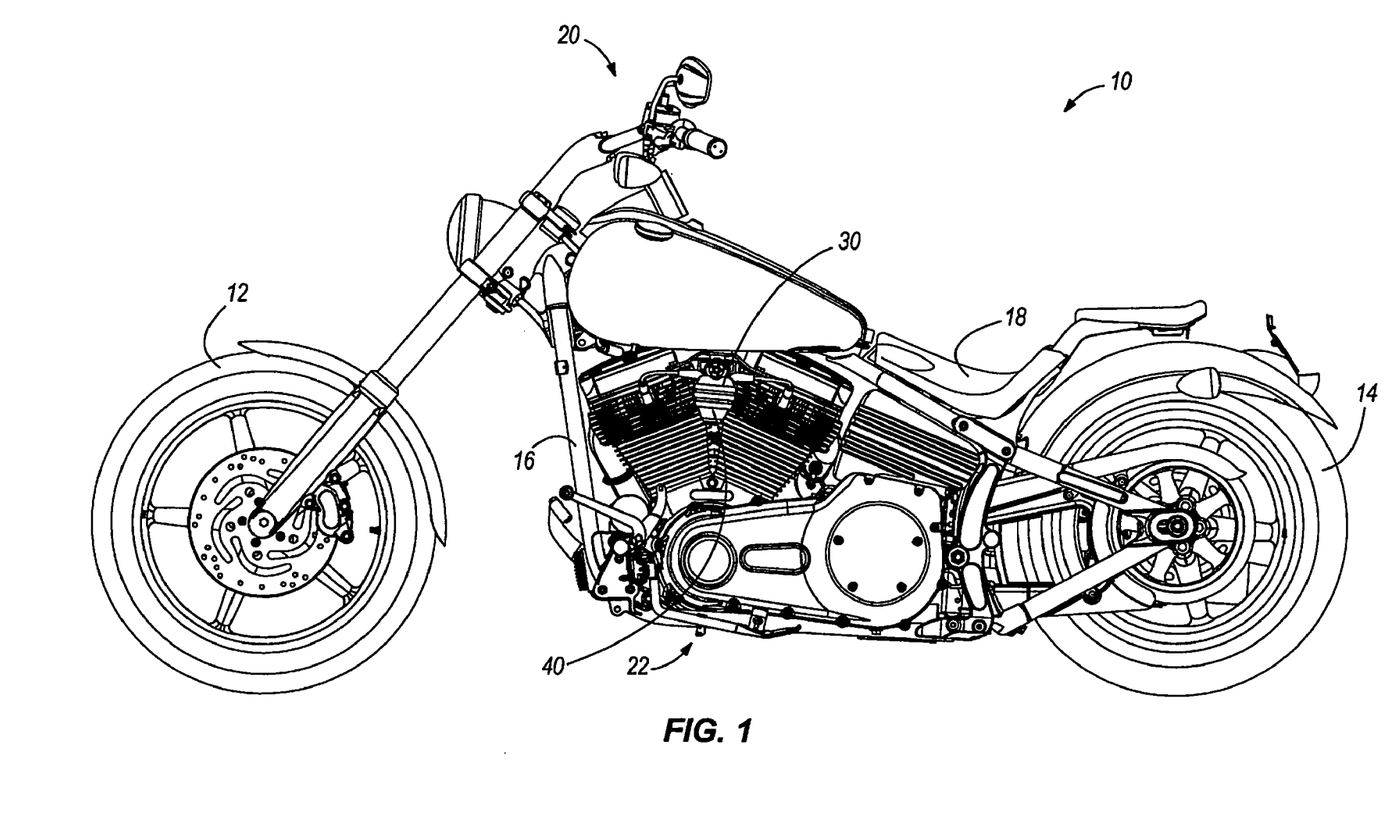
FIG. 1 is a side view of a motorcycle according to an embodiment of the invention.

The motorcycle 10 of FIG. 1 includes a front wheel 12 and a rear wheel 14 supporting a frame 16 for movement over the ground, a rider seat 18 supported on the frame 16, and a handlebar assembly 20 operably coupled to the front wheel 12 for controlling steering of the motorcycle 10. The motorcycle 10 further includes an engine 22 for driving the rear wheel 14 and an integrated ignition and key switch assembly 30 coupled to the engine 22.

Figure 2:
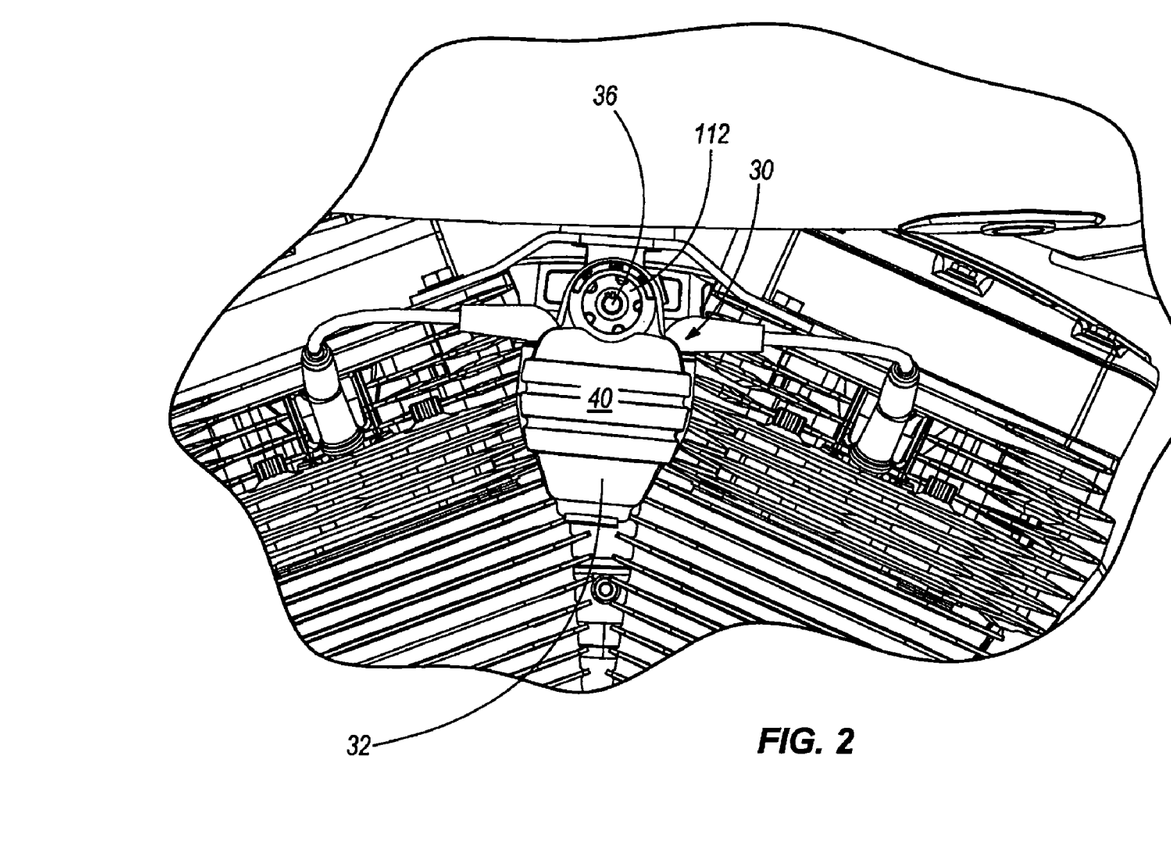
FIG. 2 is an enlarged side view of a portion of the motorcycle of FIG. 1 detailing an ignition and key switch assembly.
Figure 3:
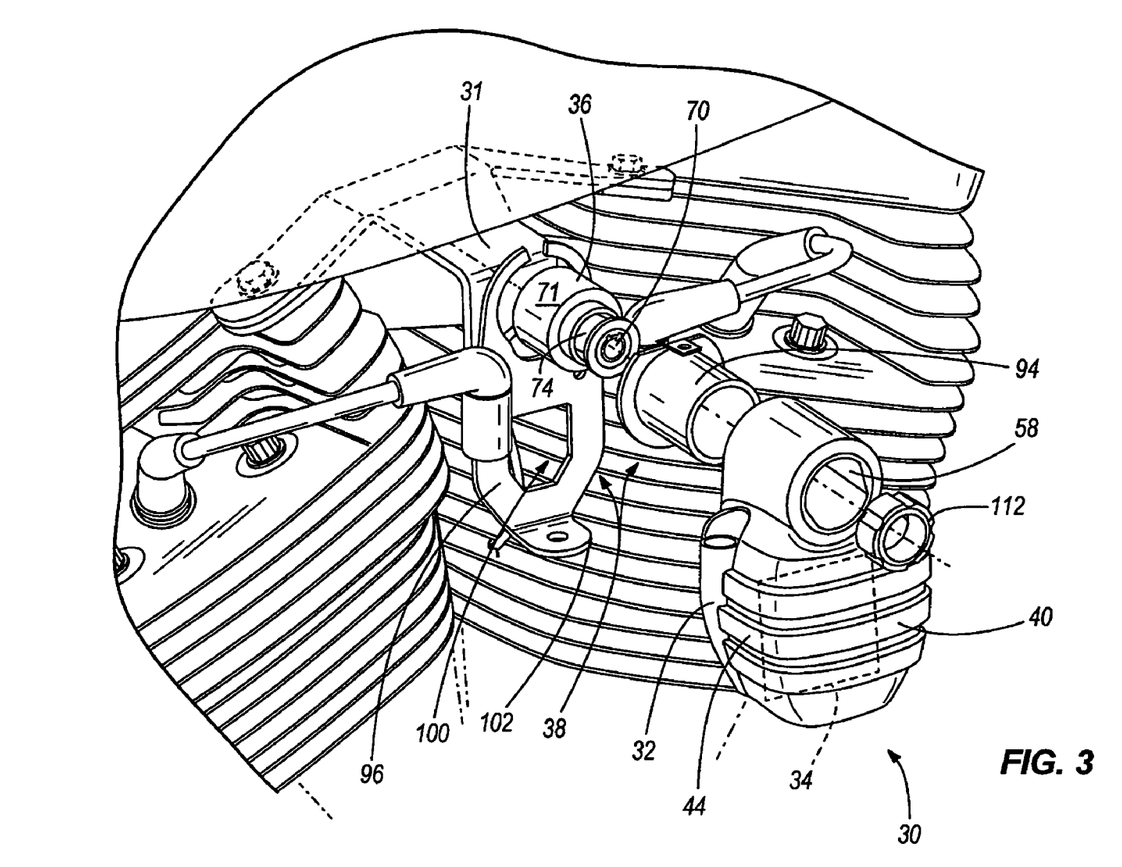
FIG. 3 is an exploded perspective view of the ignition and key switch assembly of FIG. 2 in relation to the motorcycle.
Figure 4:
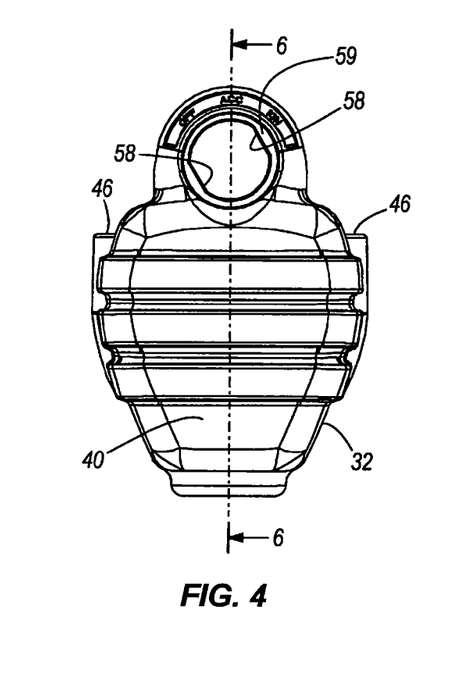
FIG. 4 is a front view of a cover of the assembly of FIG. 3.
Figure 5:
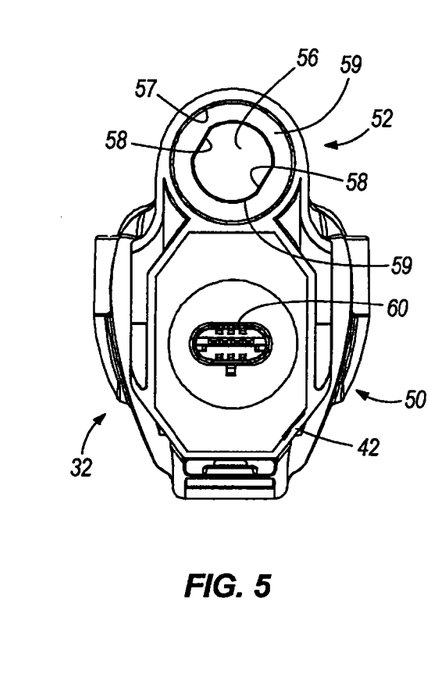
FIG. 5 is a rear view of the cover of FIG. 4.
Figure 13:
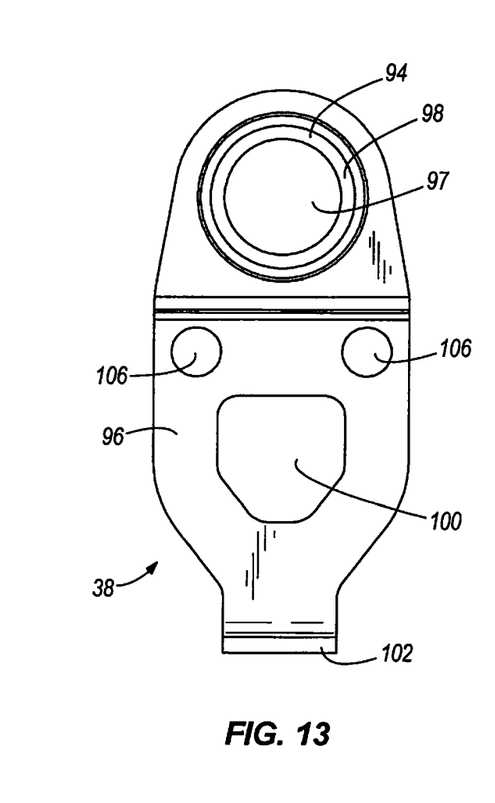
FIG. 13 is a front view of a mounting bracket of the assembly of FIG. 3.
Figure 14:
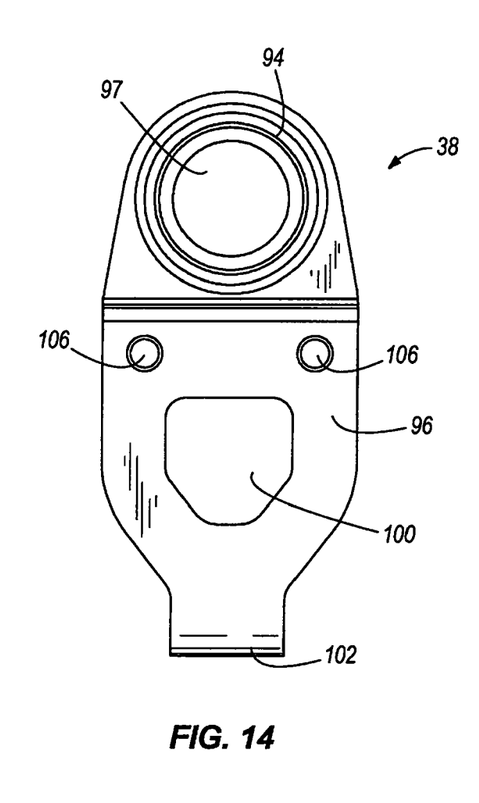
FIG. 14 is a rear view of the mounting bracket of FIG. 13.
Figure 15:
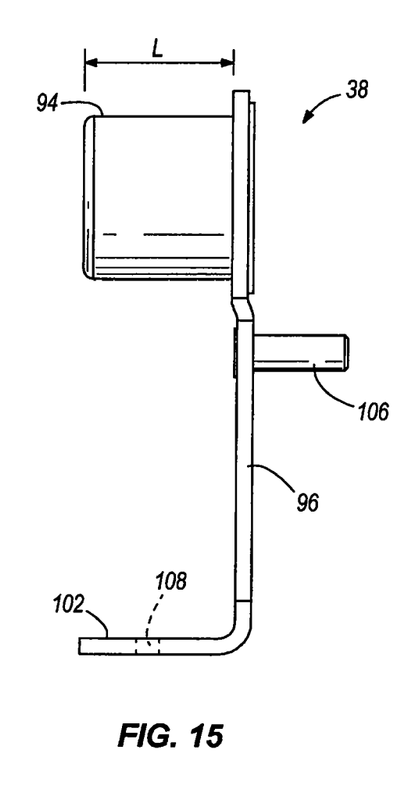
FIG. 15 is a side view of the mounting bracket of FIG. 13.

FIG. 2 illustrates the integrated ignition and key switch assembly 30 (hereinafter "the ignition assembly 30") in more detail. The ignition assembly 30 is operably coupled to the engine 22 (not visible) for initiating operation of and providing spark to the engine 22. FIG. 3 illustrates the components of the ignition assembly 30, including a cover 32 that supports an ignition coil 34. The ignition coil 34 is shown schematically in FIG. 9. The ignition assembly 30 also includes a key switch 36, and a mounting bracket 38 for mounting the cover 32 to the motorcycle 10. FIG. 3 shows the mounting bracket 38 as two pieces for clarity; however, the mounting bracket 38 is actually a single piece as shown in FIGS. 13-15. The ignition assembly 30 is mounted to the motorcycle 10 with an engine mounting bracket 31.

FIGS. 4-9 illustrate the cover 32 in more detail. The cover 32 has a front surface 40, a rear surface 42 and a side surface 44 that extends between and joins the front surface 40 and the rear surface 42. It is noted that the front of the cover 32 faces outwardly from the motorcycle 10 and is visible when the ignition assembly 30 is mounted to the frame 16, as shown in FIGS. 1 and 2. A pair of connector bores 46 are formed in the side surface 44. The connector bores 46 receive connectors such as wires (not shown) for coupling the ignition coil 34 to the engine 22. The cover 32 can have a variety of shapes and external geometries. The shape and external geometry of the cover front surface 40 can be arranged to be aesthetically-pleasing. The cover front surface 40 illustrated in FIG. 2, for example, is configured to resemble a hand grenade.

The cover 32 has a first portion 50 for receiving the ignition coil 34 and a second portion 52 for receiving the key switch 36. The second portion 52 is located above the first portion 50. In other constructions, however, the first and second portions 50, 52 can be arranged side-by-side, the first portion 50 above the second portion 52, etc. The first portion 50 defines a cavity in the cover 32. The second portion 52 includes a generally cylindrical bore 56 defined by an inner surface 57. The bore 56 extends from the front surface 40 to the rear surface 42 of the cover 32. Several flattened surfaces 58 are formed on a shoulder 59 in the inner surface 57 that is rearward of the front surface 40.

Figure 9:
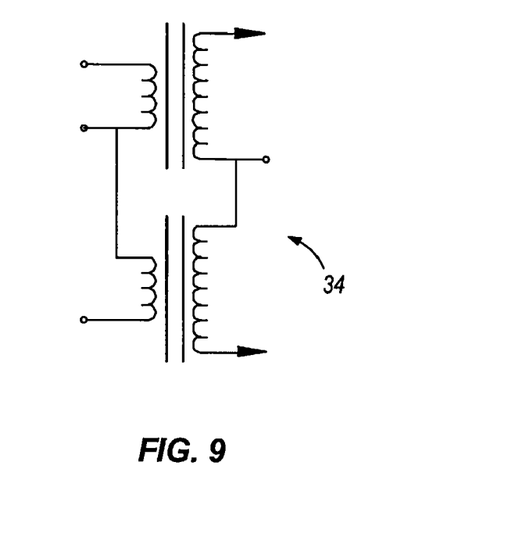
FIG. 9 is a schematic of an ignition coil according to an embodiment of the invention.

The ignition coil 34 is shown schematically in FIG. 9. The ignition coil 34 is positioned within the cover first portion 50. The ignition coil 34 includes a connector 60 (shown in FIG. 8) for operably coupling the ignition coil 34 to the key switch 36. In the illustrated construction, the connector 60 is a port. Ignition coils and associated electronics for motorcycles 10 are well known in the art and will not be discussed further herein.

Figure 6:
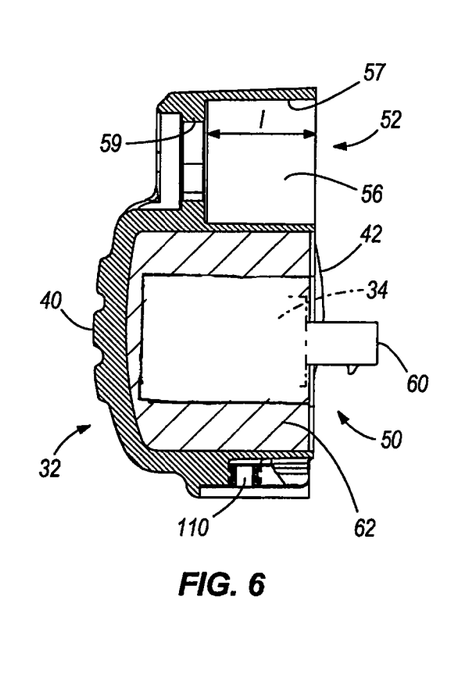
FIG. 6 is a cross-sectional view of the cover of FIG. 4 taken along line 6-6.
Figure 7:
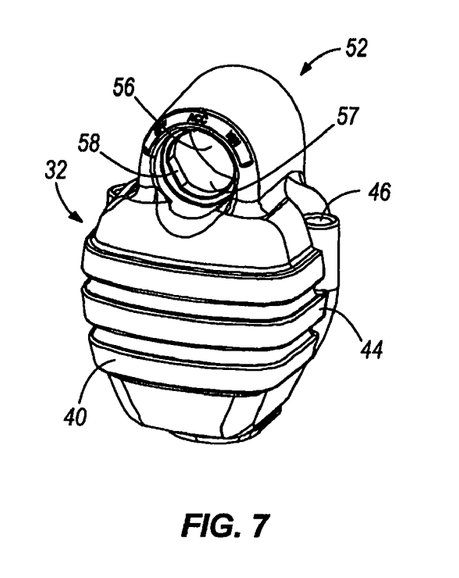
FIG. 7 is a front perspective view of the cover of FIG. 4.
Figure 8:
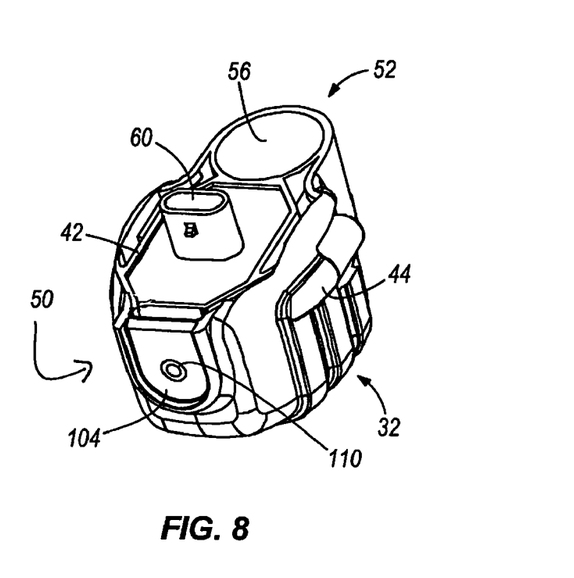
FIG. 8 is a rear perspective view of the cover of FIG. 4.

As illustrated in FIG. 6, a protective layer 62 is formed about the ignition coil 34. The protective layer 62 is formed of an epoxy material and permanently secures the ignition coil 34 within the cover 32. In other words, the protective layer 62 and ignition coil 34 are not removable from the cover 32 without damaging the ignition coil 34. The protective layer 62 provides a framework for securing the ignition coil 34 within the first portion 50 and also protects the ignition coil 34. The protective layer 62 is sized and shaped to substantially fill the first portion 50 so that there are no gaps or voids between the cover 32 and the protective layer 62. Thus, an outer geometry of the protective layer 62 is complementary to an inner geometry of the cover 32. The protective layer 62 forms the rear surface 42 of the cover 32 with the connector 60 protruding exterior to the protective layer 62 for connection to the key switch 36. In other constructions, the protective layer 62 is absent. In the absence of the protective layer 62, the ignition coil 34 is coupled to the cover 32 within the first portion 50.

Figure 10:
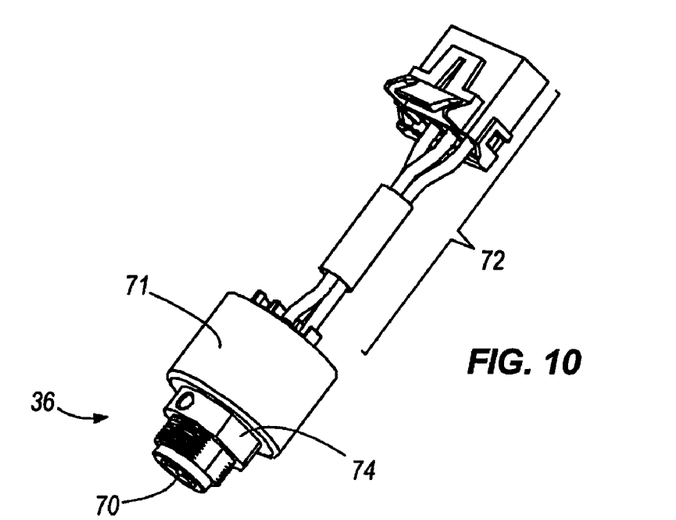
FIG. 10 is a perspective view of a key switch of the assembly of FIG. 3.
Figure 11:
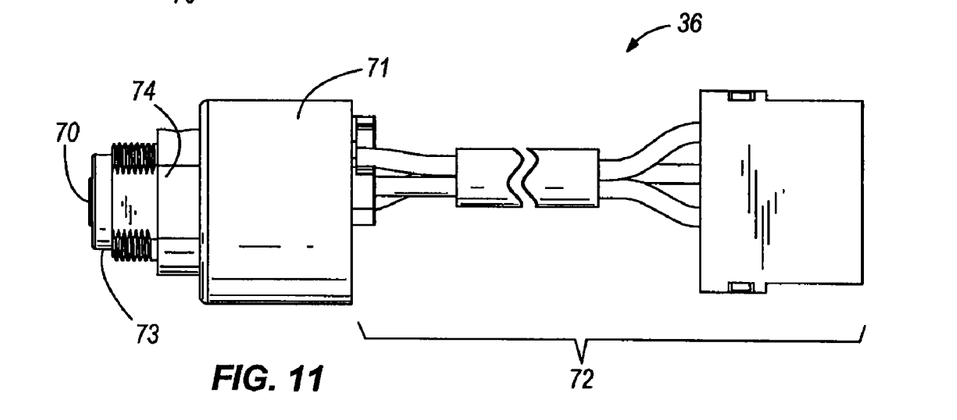
FIG. 11 is a side view of the key switch of FIG. 10.
Figure 12:
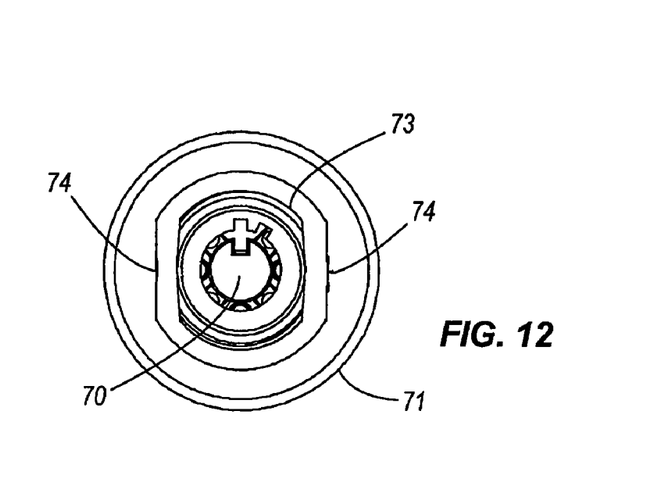
FIG. 12 is a front view of the key switch of FIG. 10.

FIGS. 10-12 illustrate the key switch 36 in more detail. The key switch 36 includes a key acceptor 70 for receiving a motor ignition key, a cylindrical electronics housing 71 supporting associated electronics (not shown) and one or more connectors 72 for coupling the key switch 36 to the ignition coil 34. The key acceptor 70 has a smaller outer diameter than the electronics housing 71. Furthermore, an outer surface 73 of the key acceptor 70 is threaded and includes one or more flattened surfaces 74.

FIGS. 13-15 illustrate the mounting bracket 38 in more detail. The mounting bracket 38 includes a first or sleeve portion 94 and a second or support portion 96 depending from the sleeve portion 94. The sleeve portion 94 defines a bore 97 and is sized to be received in the cover bore 56 rearward of the shoulder 59. A length L of the sleeve portion 94 is approximately the same as a length l of the inner surface 58 of the cover bore 56 rearward of the shoulder 59. Thus, when the cover 32 is mounted on the mounting bracket 38, the shoulder 59 abuts a front surface 98 of the sleeve portion 94, and the rear surface 42 abuts the support portion 96.

The support portion 96 of the mounting bracket 38 depends downwardly from the sleeve portion 94 and is oriented vertically to abut the rear surface 42 of the cover 32. The support portion 96 includes an access aperture 100 to accommodate the connector 60. The mounting bracket 38 also includes a third or lower portion 102 depending from the support portion 96. The lower portion 102 extends horizontally from the support portion 96 and provides a support surface for supporting the cover 32. The illustrated cover 32 includes a shaped recess 104 for cooperating with the lower portion 102 (see FIG. 8). A shape or outer profile of the mounting bracket 38 approximately matches a shape or outer profile of the cover 32. When the cover 32 is mounted to the mounting bracket 38, the cover 32 conceals the mounting bracket 38 from view (see FIGS. 1 and 2). This contributes to an aesthetically-pleasing appearing of the motorcycle 10.

Figure 16:
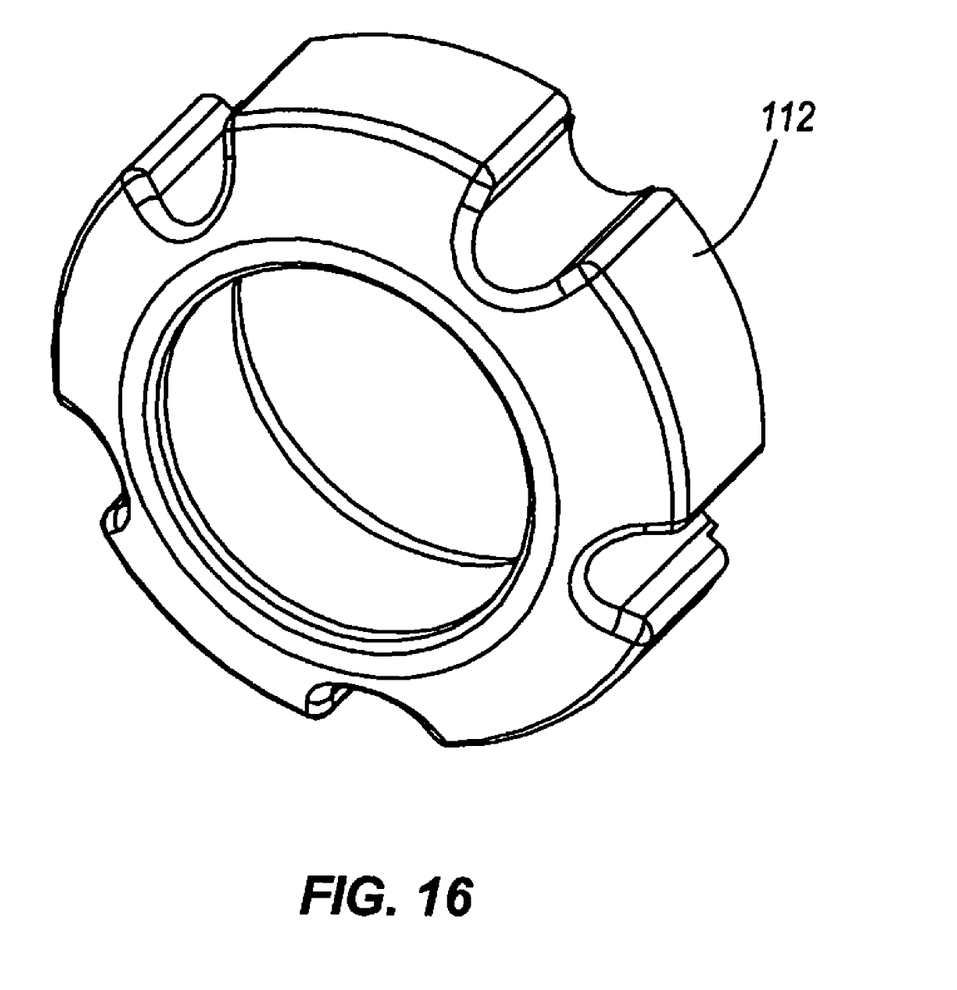
FIG. 16 is a perspective view of a retaining nut of the assembly of FIG. 3.

Returning to FIGS. 13-14, two support studs 106 extend rearwardly from the mounting bracket 38. The support studs 106 are coupled to the engine mounting bracket 31 for mounting the mounting bracket 38 to the engine mounting bracket 31. An aperture 108 is formed in the lower support 102 for receiving a fastener 109 (see FIGS. 17 and 18). The cover 32 likewise includes an aperture 110 located in the recess 104 so that the lower support 102 can be secured to the cover 32 at installation (see FIGS. 8 and 17). A retaining nut 112, as shown in FIG. 16, is provided for securing the cover 32 and the key switch 36 to the mounting bracket 38. The retaining nut 112 is located at the front surface 40 of the cover 32 and is threaded with the threaded outer surface 73 of the key acceptor 70. The retaining nut 112 faces forwardly in relation to the cover 32, as shown in FIG. 2. Therefore, the shape and appearance of the retaining nut 112 can be chosen to contribute to the aesthetically-pleasing appearance of the ignition assembly 30.

To install the ignition assembly 30 on the motorcycle 10, the electronics housing 71 is inserted into the sleeve portion 94 so that the electronics housing 71 is located within the sleeve bore 97. The key acceptor 70 protrudes forwardly of the sleeve portion 94. Next, the mounting bracket 38 is mounted to the engine mounting bracket 31 by coupling the studs 106 to the engine mounting bracket 31. With the mounting bracket 38 mounted to the engine mounting bracket 31, the support portion 96 and the lower portion 102 extend downwardly below the key switch 36. In the illustrated construction, the mounting bracket 38 is not positively fastened to the key switch 36 at this stage. In other constructions, the mounting bracket 38 can be fastened or otherwise secured to the key switch 36 at this stage.

Figure 17:
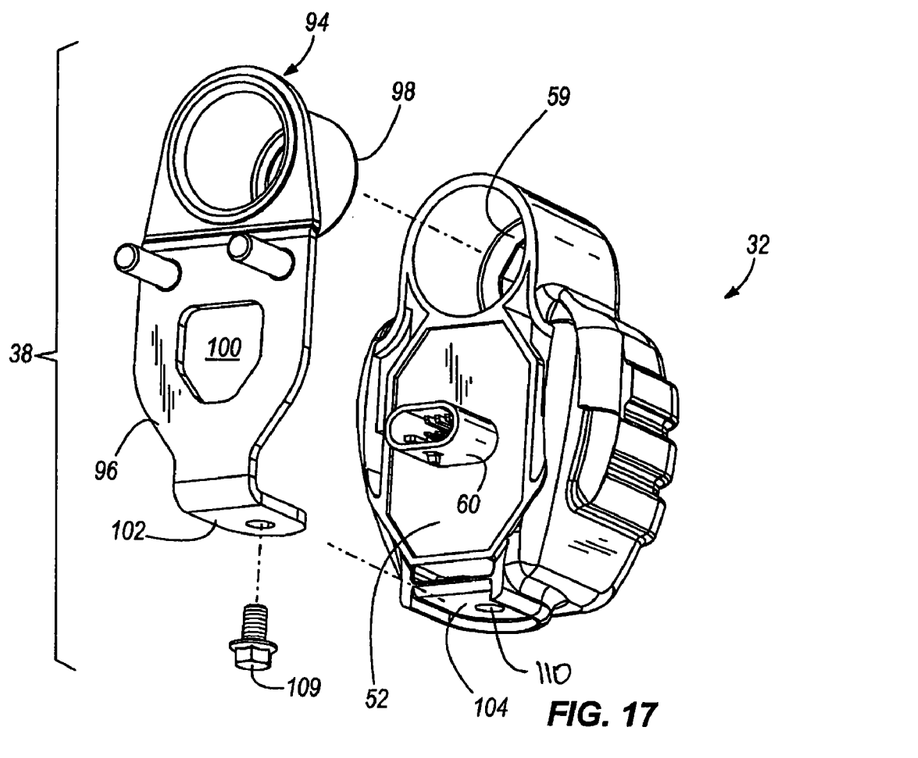
FIG. 17 is an exploded view of the cover and the mounting bracket of the assembly of FIG. 3.
Figure 18:
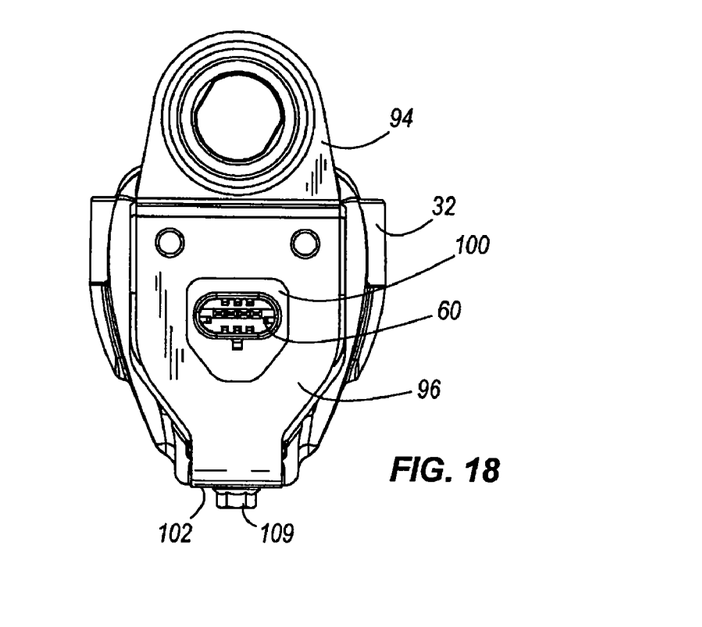
FIG. 18 is a rear view of the cover assembled with the mounting bracket.

Next, the cover 32 is installed on the mounting bracket 38, as shown in FIGS. 17 and 18. The cover bore 56 is aligned with the sleeve portion 94, and the cover 32 is slid over the sleeve portion 94 until the shoulder 59 abuts the sleeve forward surface 98. In order to fully seat the cover 32 on the mounting bracket 38, the cover 32 must be aligned with the key acceptor 70, as shown in FIG. 3. The cover 32 is aligned with the key acceptor 70 by aligning the flattened surfaces 58 of the cover 32 with the flattened surfaces 74 of the key acceptor 70. With the surfaces 58, 74 aligned, the cover 32 is slid over the key acceptor 70 so that the cover rear surface 42 abuts the support portion 96. As shown in FIG. 18, the lower portion 102 is seated in the recess 104 to support the cover 32. The ignition connector 60 is aligned with and protrudes rearwardly through the access aperture 100.

The flattened surfaces 58, 74 cooperate to form an aligning feature. The aligning feature prevents installation of the cover 32 on the key switch 36 unless the cover 32 is properly aligned with the key switch 36. In other embodiments, the aligning feature is a protrusion and cooperating recess or other complementary feature on the cover 32 and key switch 36.

FIG. 2 shows the cover 32 fully seated over the sleeve portion 94 so that the key acceptor 70 is positioned at the front surface 40 of the cover 32. The retaining nut 112 is then threaded onto the key acceptor 70 and tightened to clamp the key switch 36 in between the cover 32 and the mounting bracket 38. Spark plugs are inserted into the connector bores 46 to couple the ignition assembly 30 to the engine 22. A fastener is then driven through the apertures 108, 110 to fasten the cover 32 to the lower support 102.

With the cover 32 mounted to the mounting bracket 38, the connector 60 protrudes rearwardly through the access aperture 100 and is connected to the key switch connector 72. The key switch 36 and the ignition coil 34 are thereby coupled to one another and to the engine 22.

The ignition assembly 30 described herein provides an aesthetically pleasing cover 32 contributing to the overall aesthetic of the motorcycle 10. The ignition assembly 30 also provides an integrated key switch 36 and ignition coil 34 unit for ease of installation and servicing. The ignition assembly 30 provides the key switch 36 and the ignition coil 34 integrated into a single unit so as to be physically near to one another. The connectors 60,72 are therefore relatively short. This eliminates the need for providing a passageway for one or both of the connectors 60, 72 as would be needed if the key switch 36 was located distantly from the ignition coil 34. The ignition assembly 30 is accessible from the exterior of the motorcycle 10 for removal, servicing and/or replacement of the ignition coil 34 and/or the key switch 36. The ignition assembly 30 is serviced by removing the retaining nut 112 and any fasteners coupling the cover 32 to the mounting bracket 38. The cover 32 and ignition coil 34 are removed and replaced as a single unit by sliding the cover 32 off of the mounting bracket 38 and sliding a new cover 32 onto the mounting bracket 38. By further removing the mounting bracket 38, the key switch 36 can be serviced.

Various features and advantages of the invention are set forth in the following claims.

What is claimed is:

1. An ignition and key switch assembly for a motorcycle, the ignition and key switch assembly comprising:
    a cover having a front surface, a rear surface, a first cover portion and a second cover portion;
    an ignition coil located in the first cover portion; and
    a key switch received within the second cover portion and being accessible at the cover front surface,
    wherein the ignition coil is held in the first cover portion by a protective layer.

2. The ignition and key switch assembly of claim 1, wherein the protective layer is formed of an epoxy.

3. The ignition and key switch assembly of claim 1, wherein the ignition coil is permanently secured within the cover.

4. The ignition and key switch assembly of claim 1, wherein the key switch is removable from the cover.

5. The ignition and key switch assembly of claim 1, further comprising a mounting bracket for mounting the cover to the key switch.

6. The ignition and key switch assembly of claim 1, further comprising an aligning feature for aligning the cover to the key switch.

7. The ignition and key switch assembly of claim 6, wherein the aligning feature includes cooperating flattened surfaces on the key switch and cover.

8. A motorcycle comprising:
    a pair of wheels;
    a frame supported on the wheels for movement;
    an engine for driving rotation of the wheels; and
    an ignition and key switch assembly operably coupled to the engine, the ignition and key switch assembly comprising:
        a cover having a front surface, a rear surface, a first cover portion and a second cover portion;
        an ignition coil located in the first cover portion; and
        a key switch received in the second cover portion and accessible at the cover front surface,
        wherein the ignition coil is held in the first cover portion by a protective layer.

9. The motorcycle of claim 8, wherein the protective layer is formed of an epoxy.

10. The motorcycle of claim 8, wherein the ignition coil is permanently secured within the cover.

11. The motorcycle of claim 8, wherein the key switch is removable from the cover.

12. The motorcycle of claim 8, further comprising an aligning feature for aligning the cover to the key switch.

13. The motorcycle of claim 12, wherein the aligning feature includes cooperating flattened surfaces on the key switch and the cover.

14. The motorcycle of claim 8, further comprising a mounting bracket for mounting the cover to the frame.

15. A method of installing an ignition and key switch on a motorcycle, the method comprising:
    mounting the key switch to the motorcycle;
    sliding a cover over the key switch so that the key switch is located in a first portion of the cover, the cover supporting an ignition coil in a second portion;
    securing the cover to the key switch; and
    operably coupling the key switch and the ignition coil,
    wherein mounting the key switch to the motorcycle includes mounting a mounting bracket to the motorcycle and supporting the key switch on the mounting bracket.

16. The method of claim 15, wherein sliding the cover over the key switch further comprises aligning the cover with the key switch.

17. The method of claim 15, further comprising servicing the motorcycle by detaching the cover from the mounting bracket and replacing the cover and ignition coil.

18. An ignition and key switch assembly for a motorcycle, the ignition and key switch assembly comprising:
    a cover having a front surface, a rear surface, a first cover portion and a second cover portion;
    an ignition coil located in the first cover portion;
    a key switch received within the second cover portion and being accessible at the cover front surface; and
    a mounting bracket for mounting the cover to the key switch.

19. A motorcycle comprising:
    a pair of wheels;
    a frame supported on the wheels for movement;
    an engine for driving rotation of the wheels; and
    an ignition and key switch assembly operably coupled to the engine, the ignition and key switch assembly comprising:
        a cover having a front surface, a rear surface, a first cover portion and a second cover portion;
        an ignition coil located in the first cover portion;
        a key switch received in the second cover portion and accessible at the cover front surface; and
        a mounting bracket for mounting the cover to the frame.

* * * * *